United States Patent
Igarashi

(10) Patent No.: US 7,099,242 B2
(45) Date of Patent: Aug. 29, 2006

(54) DISK DRIVE, DISK DRIVE CONTROLLING METHOD AND DISK DRIVE CONTROLLING PROGRAM

(75) Inventor: Fumiya Igarashi, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 560 days.

(21) Appl. No.: 10/647,421

(22) Filed: Aug. 25, 2003

(65) Prior Publication Data

US 2004/0042308 A1    Mar. 4, 2004

(30) Foreign Application Priority Data

Aug. 30, 2002   (JP)   ............... 2002-255990

(51) Int. Cl.
*G11B 7/00*   (2006.01)

(52) U.S. Cl. ............... 369/44.11; 369/44.27; 369/44.32; 369/53.1

(58) Field of Classification Search ............... None
See application file for complete search history.

(56) References Cited

U.S. PATENT DOCUMENTS 5,844,872 A   12/1998  Kubo et al.
5,963,517 A   10/1999  Nakagaki et al.
6,377,527 B1   4/2002  Hirashima

FOREIGN PATENT DOCUMENTS

EP   0 978 826   2/2000

*Primary Examiner*—Muhammad Edun
(74) *Attorney, Agent, or Firm*—Ladas and Parry LLP

(57) ABSTRACT

A disk drive determines whether or not a currently loaded disk is a gravity center deviated disk based on a tracking error signal detected at different disk rotation speeds.

15 Claims, 6 Drawing Sheets

DISK DRIVE, DISK DRIVE CONTROLLING METHOD AND DISK DRIVE CONTROLLING PROGRAM

BACKGROUND OF THE INVENTION

1. Field of the Invention

The present invention relates to a disk drive, a disk drive controlling method and a disk drive controlling program, and, in particular, to a disk drive having a capability of properly handling a gravity center deviated disk, a disk drive controlling method for properly handling a gravity center deviated disk, and a disk drive controlling program for executing the method.

2. Description of the Related Art

A disk recording medium such as a CD has an information recording track (hereinafter, simply referred to as a 'track') or tracks on which data is recorded via a read/write head (optical pickup in a case of CD), as well known. Such a track is formed spirally in general, and, in many case, this spiral is not an exact concentric one by reason concerning, for example, an accuracy of the center hole of the disk, a circularity of the disk, or so. Therefore, during rotation of the disk in a disk drive for reading/reproducing data recorded thereon, a misalignment may occur between an optical pickup (in the case of CD) of the dirk drive and the relevant track of the disk. A tracking error signal, simply abbreviated as a TE signal hereinafter, as well known, indicates such a misalignment, and has a magnitude in proportion to the amount of the detected misalignment.

Either a gravity center deviated disk or an eccentric disk may cause such a misalignment phenomenon. The eccentric disk is a disk in which the track on the disk has shifted with respect to the proper spiral one, and, even in such a case, by a tracking servo control, a proper information reading/writing operation may be achieved on the disk as long as the amount of the eccentricity exceeds a predetermined threshold. However, in a case of the above-mentioned gravity center deviated disk, in which the gravity center of the disk is shifted from the exact rotation center thereof, an abnormal vibration may occur thereon which may obstruct proper information reading/writing operation on the disk with the optical pickup. In order to avoid such a situation, it is necessary to lower the disk rotation speed in case the disk currently loaded is the exocentric gravity center disk.

However, it is difficult in general to determine whether such a misalignment occurring between the optical pickup and the track on the disk is caused by the reason that the disk is a gravity center deviated disk or an eccentric disk.

SUMMARY OF THE INVENTION

The present invention has been devised for providing a disk drive which can determine whether or not a disk currently loaded therein is a gravity center deviated disk, and thereby, can take a proper measure on handling the disk so as to achieve a proper information reading/writing operation thereon, a disk drive controlling method applied in the disk drive, and a disk drive controlling program according to which a computer executes the method in the disk drive.

According to the present invention, a tracking error signal detection part detects a tracking error signal, and a gravity center deviated disk determination part determines whether or not a disk loaded is a gravity center deviated disk based on the tracking error signal detected at different disk rotation speeds by this tracking error signal detection part in a disk drive.

Thereby, based on the tracking error signal at a time of rotating the disk at different rotation speeds, the disk drive which can determine whether or not the disk is a gravity center deviated disk can be provided, in which a measure may be taken based on the determination for properly handling the disk even when it is a gravity center deviated disk.

Furthermore, it is preferable that a rotation speed control part is further provided to control the rotation speed of the disk, based on the determination result of the gravity center deviated disk determination part.

Thereby, the disk drive which can properly control the rotation speed according to the disk condition can be provided in which the determination result of the gravity center deviated disk determination part is used for this propose.

A disk drive controlling method according to the present invention has the steps of detecting a tracking error signal, and determining whether or not the disk is a gravity center deviated disk based on the tracking error signal detected at the above-mentioned detection step.

Thereby, based on the tracking error signal at a time of rotating a disk detected at different rotation speeds, it is possible to determine whether or not the disk is a gravity center deviated disk, and to achieve a proper information recording/reproduction on the disk with a measure taken based on the above-mentioned determination for the purpose of properly handling the disk even when it is a gravity center deviated disk.

A disk drive controlling program according to the present invention has instructions written therein for detecting a tracking error signal, and determining whether or not the disk is a gravity center deviated disk based on the tracking error signal detected as mentioned above.

Thereby, based on the tracking error signal at a time of rotating a disk detected at different rotation speeds, it is possible to determine whether or not the disk is an gravity center deviated disk, and to achieve a proper information recording/reproduction on the disk with a measure taken based on the determination for the purpose of properly handling the disk even when it is a gravity center deviated disk, under control of a computer which operates according to the program.

BRIEF DESCRIPTION OF THE DRAWINGS

Other objects and further features of the present invention will become more apparent from the following detailed description when read in conjunction with the following accompanying drawings.

DETAILED DESCRIPTION OF THE PREFERRED EMBODIMENT

An embodiment of the present invention will now be described with reference to figures.

Figure 1:
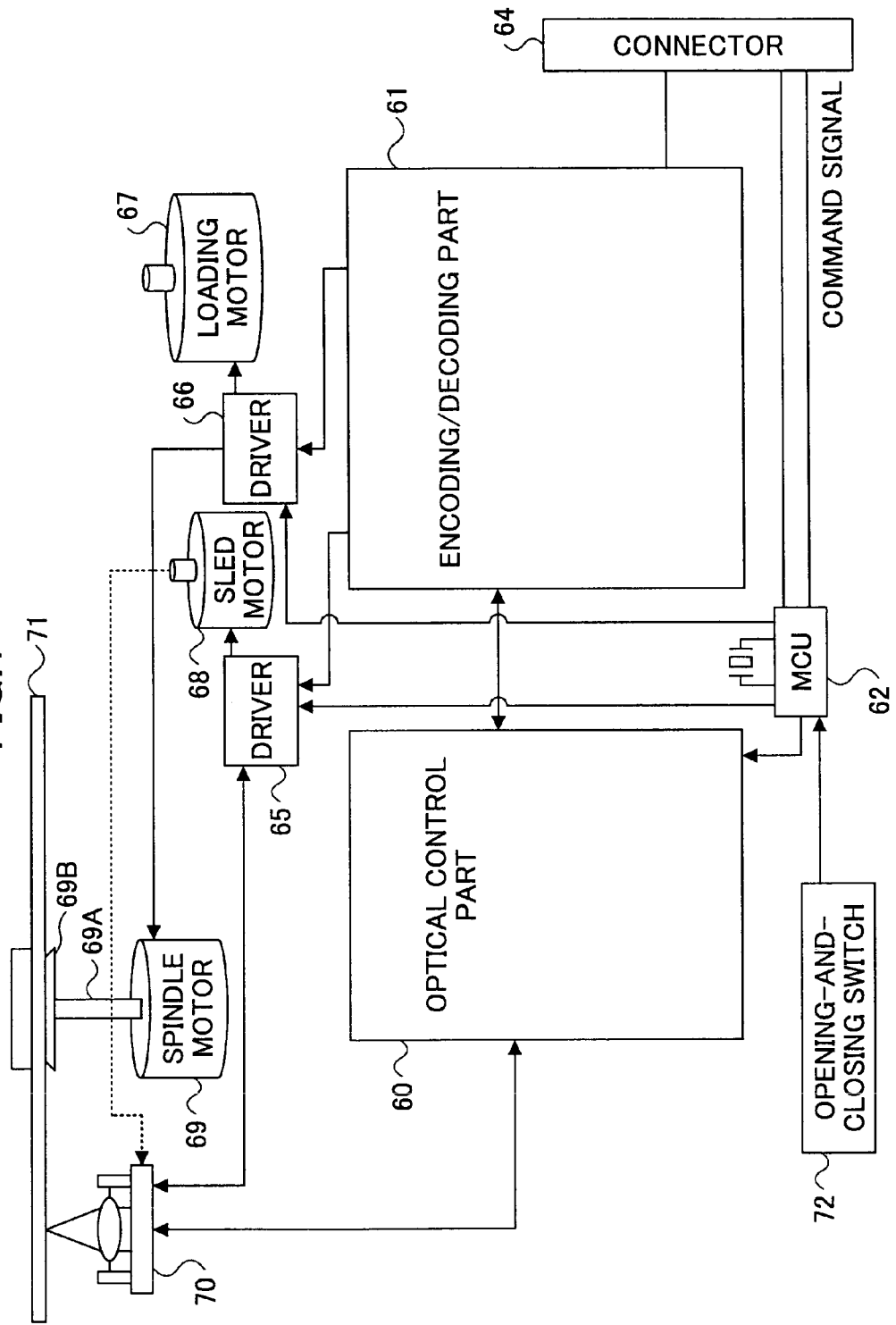
FIG. 1 is a block diagram of a disk drive according to one embodiment of the present invention.

FIG. 1 shows a general block diagram of a disk drive in an embodiment of the present invention. As shown, the disk drive includes an opening-and-closing switch 72 for making a disk tray open and close; a loading motor 67 which makes a disk tray project and retreat; an optical control part 60 which controls an optical pickup 70; a spindle motor 69 which drives a disk 71; a sled motor 68 which operates an optical pickup 70; an encoding/decoding part 61 which performs encoding and decoding of coded data to be written into the disk 71 or read out from the disk 71; a connector 64 for connecting the disk drive with a mother board; and an MCU 62 which performs control of the entire disk drive.

In this configuration, an information recording disk 71, for example, a CD (compact disk), is placed on the disk tray (not shown), and then, the opening-and-closing switch 72 is pressed, by an operator. As a result, the loading motor 67 drives the disk tray, and thus, the disk tray carries the disk 71 into the inside of the disk drive. After that, by a function of a disk loading mechanism (not shown), the disk 71 is loaded onto a turn table 69B, which is provided on the top end of a rotating shaft 69A of the spindle motor 69.

Then, a command signal is input from the external mother board via the connector 64 to the MCU 62, and thereby the optical control part 60 is operated. Under control by the optical control part 60, the drivers 65 and 68 are operated, and, as a result, the spindle motor 69 and the sled motor 68 are operated. Thereby, the disk 71 is rotated at a predetermined rotation speed, while the optical pickup 70 is moved along a radial direction on the disk 71. As a result, information is written into a track of the disk 71 at a predetermined radius position thereof, or information recorded into the track is read out by a similar manner.

The information thus written into the disk 71 or read out therefrom is data coded. That is, coded data read out from the disk via the optical pickup 70 is decoded by the encoding/decoding part 61, and then, is sent to the mother board via the connector 64. On the other hand, information to be recorded which is sent from the mother board via the connector 64 is once coded by the encoding/decoding part 61, and then, the thus-obtained coded data is recorded into the track of the disk 71.

In this configuration, the MCU 62 controls the rotation speed of the disk 71 via the spindle motor 69 through the driver 66. The MCU 62 also performs a tracking servo control by which the optical pickup 70 can properly traces the track on the disk 71 even when the track has an eccentricity as mentioned above with respect to the rotation center of the disk which is supported by the turntable 69B.

Figure 2:
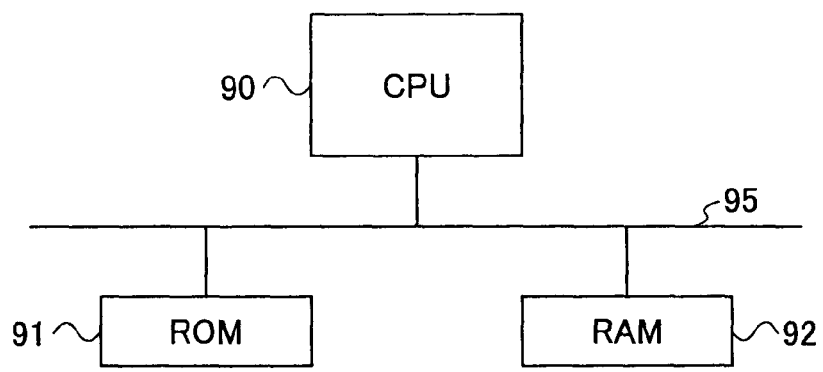
FIG. 2 is a block diagram of an MCU shown in FIG. 1.

The MCU 62 which performs such a control will now be described with reference to FIG. 2. As shown, the MCU 62 includes a CPU (Central Processing Unit) 90, a ROM (Read Only Memory) 91, and a RAM (Random Access Memory) 92, and they are connected by a common bus 95. A firmware for the CPU 90 to make it perform predetermined processing is stored in the ROM 91. This firmware includes programs which carry out a control of an OS (Operating System), registers, peripheral devices or so, and other necessary programs which control the disk drive. A flash memory or so may be provided as a non-volatile storage device as the above-mentioned ROM 91. In this case, addition of other functions, correction of defects, etc. may be performed after the disk drive is once completed in manufacture.

How to detect a TE (Tracking Error) signal according to the embodiment of the present invention will now be described. There are various methods, such as a three beam method, a push pull method, a DPD (Differential Phase Detection) method or so for detecting the TE signal in general. Thereamong, the three beam method is applied as an example in the embodiment of the present invention. However, any other method may be applied instead.

The three beam method is a method of detecting the TE signal using a main beam which is especially used for reading out a signal from the disk, and other two sub-beams A and B arranged in front of and behind the main beam. Then, the TE signal is detected from the amounts of light obtained when these sub-beams are applied to the disk surface and then are reflected thereby.

Figure 3:
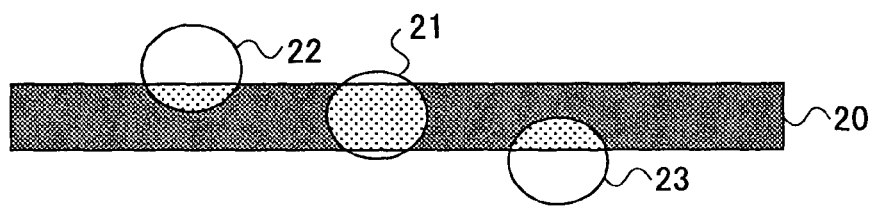
FIG. 3 illustrates a three beam method applicable in the disk drive shown in FIG. 1.

As shown in FIG. 3, on a track 20 of the disk 71, beam spots 21, 22 and 23 are formed by the above-mentioned main beam and sub-beams A and B, respectively.

Figure 4:
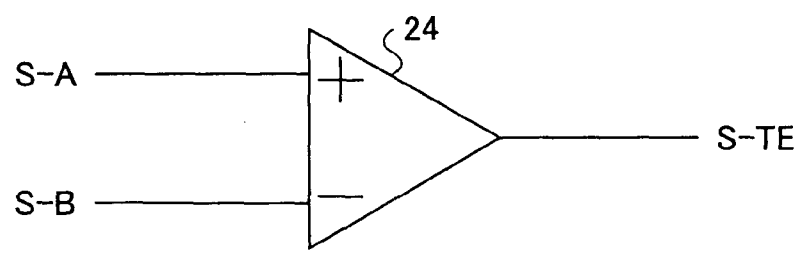
FIG. 4 shows a differential amplification circuit which detects a misalignment between an optical pickup and a track of a disk in the disk drive shown in FIG. 1.

In this configuration, lights obtained when the sub-beam A and sub-beam B are reflected by the disk surface are detected by an optical detection device (not shown), respectively, respective detection signals S-A and S-B obtained therefrom are input into a differential amplification circuit 24 shown in FIG. 4, and then, the TE signal S-TE is output from the differential amplification circuit 24, as a difference between the detection signals S-A and S-B. Incidentally, in the case of FIG. 3, no misalignment between the optical pickup 70 and the track 20 occurs, and, in fact, as shown, the beam spots 22 and 23 of the sub-beams A and B occur in a symmetrical arrangement with respect to the track 20. Accordingly, no difference occurs between the amounts in light reflected by the disk surface at the spots 22 and 23 of the sub-beams A and B. As a result, the output from the differential amplification circuit 24 shown in FIG. 4 becomes zero.

Figure 5:
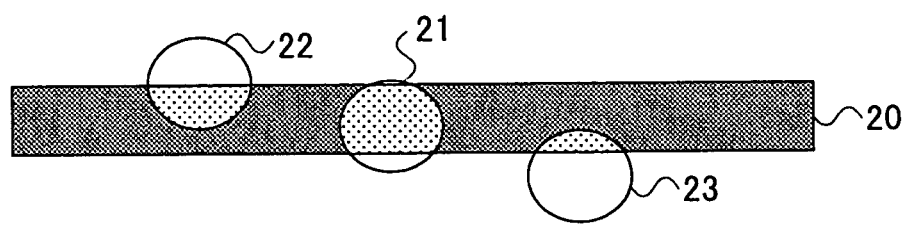
FIG. 5 illustrates a misalignment situation in relation to the above-mentioned three beam method.

On the other hand, in case a misalignment between the optical pickup 70 and the track 20 of the disk 71 occurs as shown in FIG. 5, in which, as shown, the respective spots 21, 22 and 23 of the main beam and sub-beams A and B are not arranged symmetrically with respect to the track 20, a difference occurs between the amounts in light reflected by the disk surface at these spots 22 and 23 of the sub-beams A and B accordingly. As a result, the output from the differential amplification circuit 24 shown in FIG. 4 becomes different from zero with a positive or negative value. Not only a magnitude of the output TE signal of the differential amplification circuit 24 but also a sign of the same, i.e., pulse or minus, make it possible to determine which direction the relevant misalignment occurs as well as the amount of misalignment.

The thus-detected TE signal is output to the MCU 62, and based on this TE signal, the MCU 62 determines whether the disk 71 currently loaded in the disk drive corresponds to a gravity center deviated disk or an eccentric disk. Then, by this determination result, a control of the disk rotation speed is performed by the MCU 62. Specific operations performed by the MCU 62 based on the TE signal according to the embodiment of the present invention will now be described.

Figure 6:
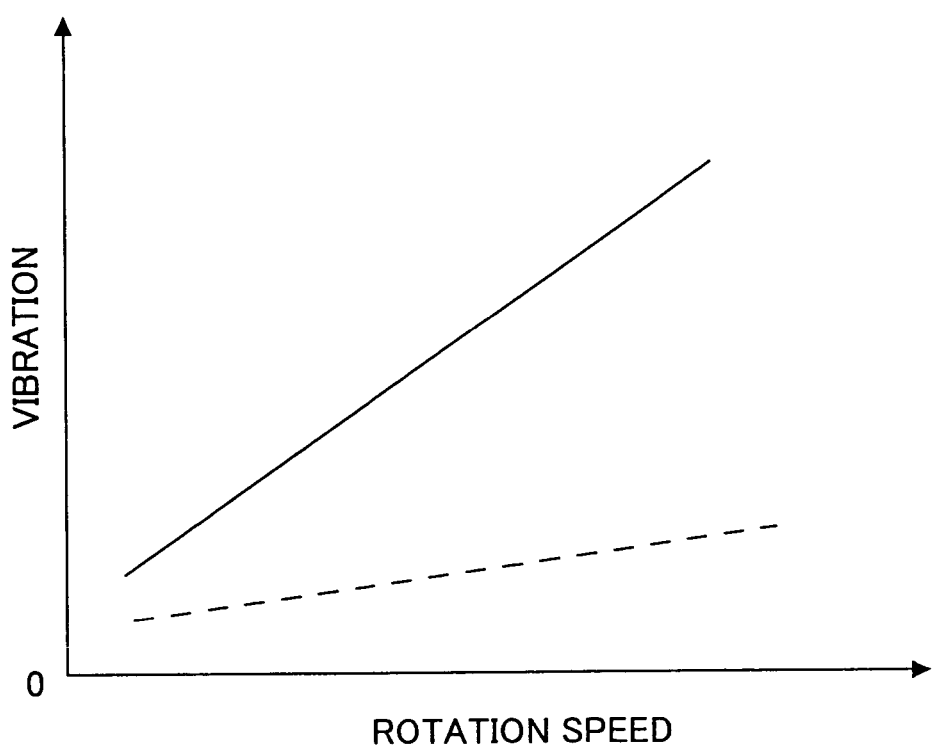
FIG. 6 shows a relation between a rotation speed of a disk and a vibration occurring thereon.

FIG. 6 shows a relation between the rotation speed of the disk and the vibration of disk drive. In this figure, the horizontal axis expresses the rotation speed of the disk while the vertical axis expresses the vibration of the disk drive. Further, a solid curve shows a case of a gravity center deviated disk, while a broken curve shows a case of an eccentric disk.

As shown, since the gravity center deviated disk has its gravity center shifted from the rotation center, upon increase in the rotation speed, the vibration occurring in the disk drive may become significantly larger accordingly. In contrast thereto, since the eccentric disk is not a perfect disk either, the vibration becomes larger slightly as shown. In the case of eccentric disk, the increase rate of the vibration is not a serious one in comparison with the case of gravity center deviated disk as shown.

The vibration occurring due to increase in the disk rotation speed is reflected by the above-mentioned TE signal accordingly. Based on this TE signal and disk rotation speed, it is determined whether the currently loaded disk is an eccentric disk or a gravity center deviated disk, as now will be described with reference to an operation flow chart shown in FIG. 7.

Figure 7:
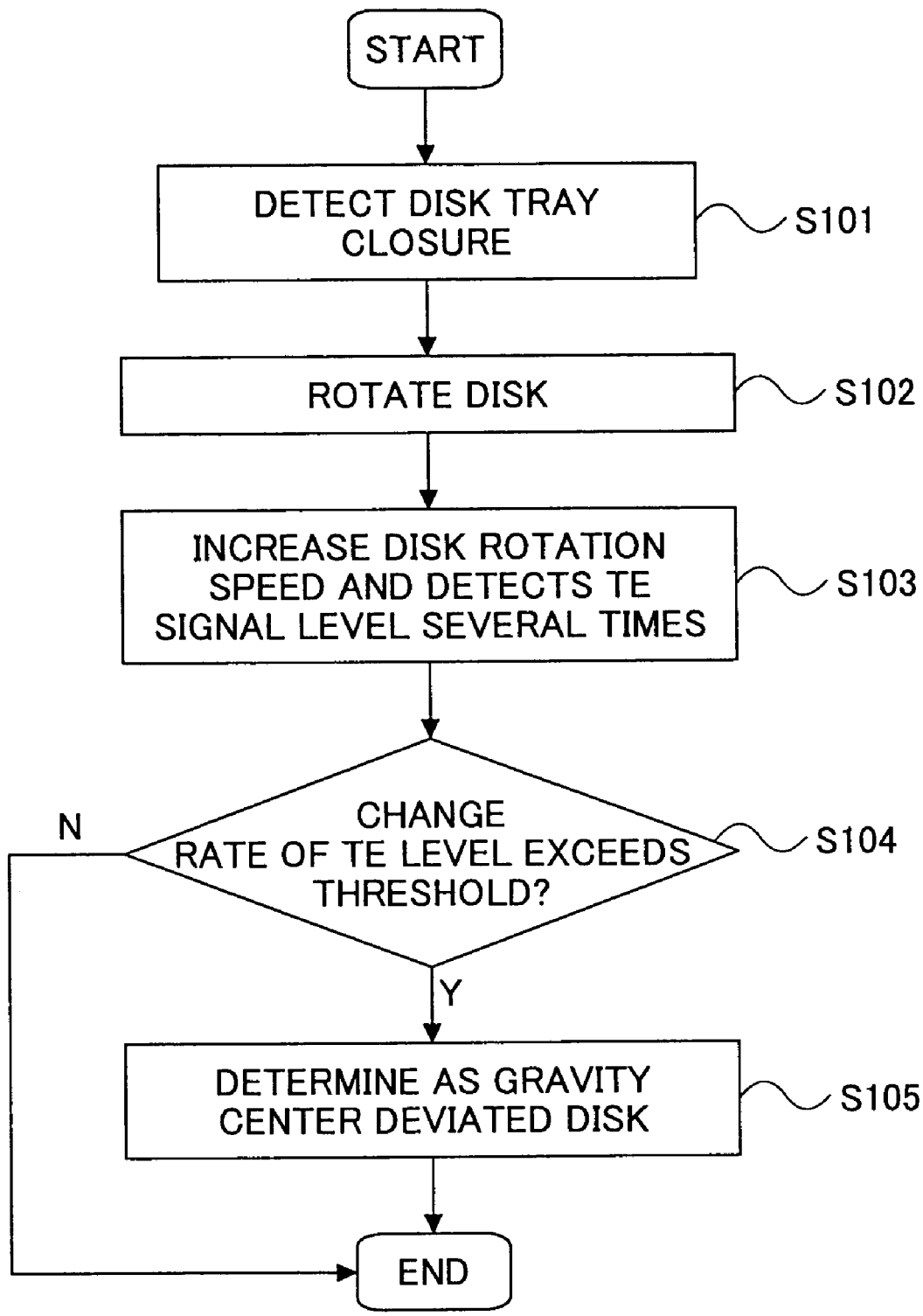
FIG. 7 is an operation flow chart which shows a process of determination for a gravity center deviated disk according to the embodiment of the present invention.

The flow chart of FIG. 7 shows the processing which is started when the disk is loaded into the disk drive by the MCU 62 for determining whether the disk is an eccentric disk or a gravity center deviated disk.

First, the MCU 62 detects that the disk tray is closed or has retreated together with the disk 71 in Step S101. Then, the MCU 62 starts rotating the disk 71 with the spindle motor 69 in Step S102. After that, the MCU 62 increases the disk rotation speed, while detecting the level of the above-mentioned TE signal several times until the disk rotation speed reaches the maximum one, in Step S103. The processing in Step S103 will now be described in detail with reference to FIG. 8.

Figure 8:
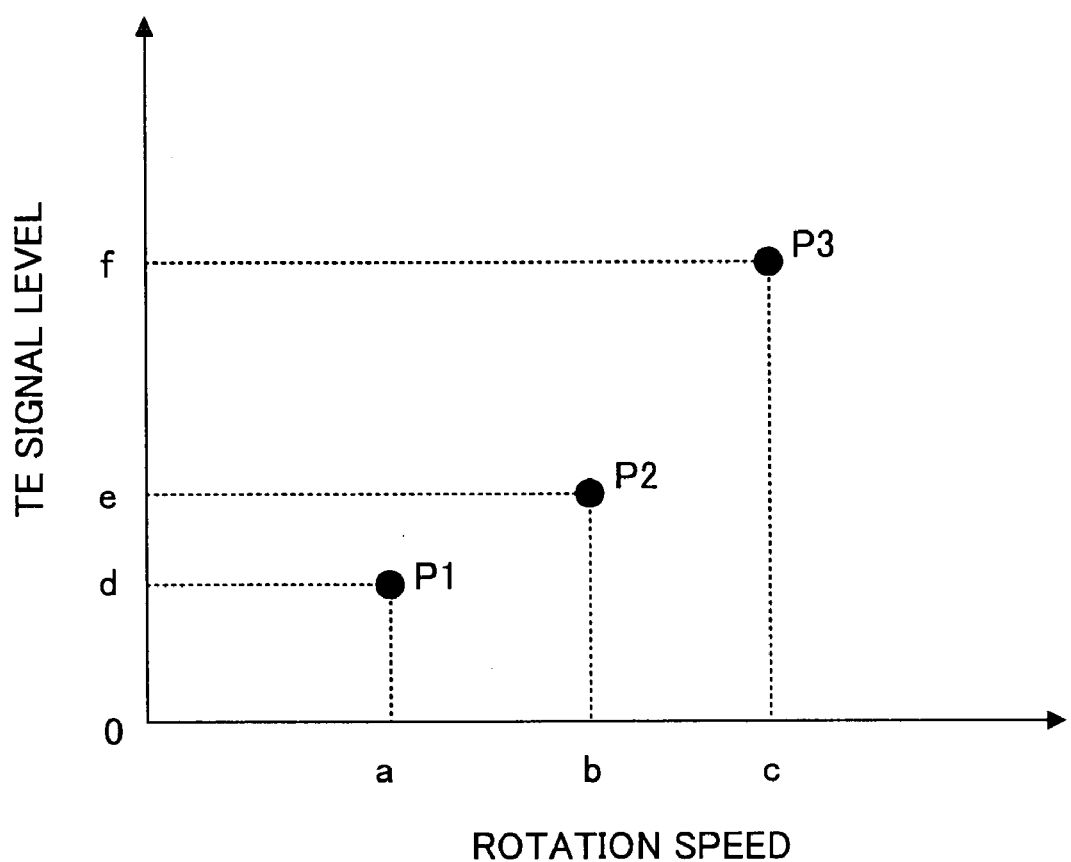
FIG. 8 shows pairs of disk rotation speed and TE signal level to be used for the process of determination for a gravity center deviated disk according to the embodiment of the present invention.

In FIG. 8, a horizontal axis expresses the rotation speed of the disk while a vertical axis expresses the level of TE signal detected. As shown, in the processing of Step S103, the MCU 62 detects the TE signal levels at the rotation speed of the disk, i.e., 'a', 'b', and 'c', and thus detects pairs (a, d), (b, e) and (c, f) of disk rotation speed and TE signal level. This detection processing may not detect such pairs of detections until the disk rotation speed becomes the highest one, and, the detection may be terminated after the change rate or variation which will now be described exceeds a predetermined threshold.

The MCU 62 determines in Step S104 whether the change rate or variation calculated from these pairs of detection obtained as mentioned above exceeds the predetermined threshold. The above-mentioned "change rate or variation" should be a value calculated which thus indicates how much the TE signal level increases as the disk rotation speed increases. For example, an inclination of a line segment extending between the points P1 (a, d) and P2 (b, e) shown in FIG. 8 obtained from a calculation of (e−d)/(b−a), an inclination of a line segment extending between the points P2 (b, e) and We (c, f) shown obtained from a calculation of (f−e)/(c−b), or so, may be used as the above-mentioned change rate or variation. Other than them, assuming that the intervals between 'a' and 'b', between 'b' and 'c', and so forth are uniform, simple differences, i.e., (e−d), (f−e) and so forth can be utilized for the same purpose.

When the thus-obtained value in the change rate or variation is not more than the predetermined threshold, the MCU 62 finishes the processing of the flow chart shown in FIG. 7. However, when the value in the change rate exceeds the threshold (Yes in Step S104), the MCU 62 determines that the currently loaded disk is a gravity center deviated disk in Step S105. As a result, the MCU 62 turns a predetermined disk flag into an ON state, for example.

The thus-obtained disk determination as to whether the currently loaded disk 71 is a gravity center deviated disk or an eccentric disk which is made when the disk 71 is loaded into the disk drive is used in a disk rotation speed control processing as will now be described.

Figure 9:
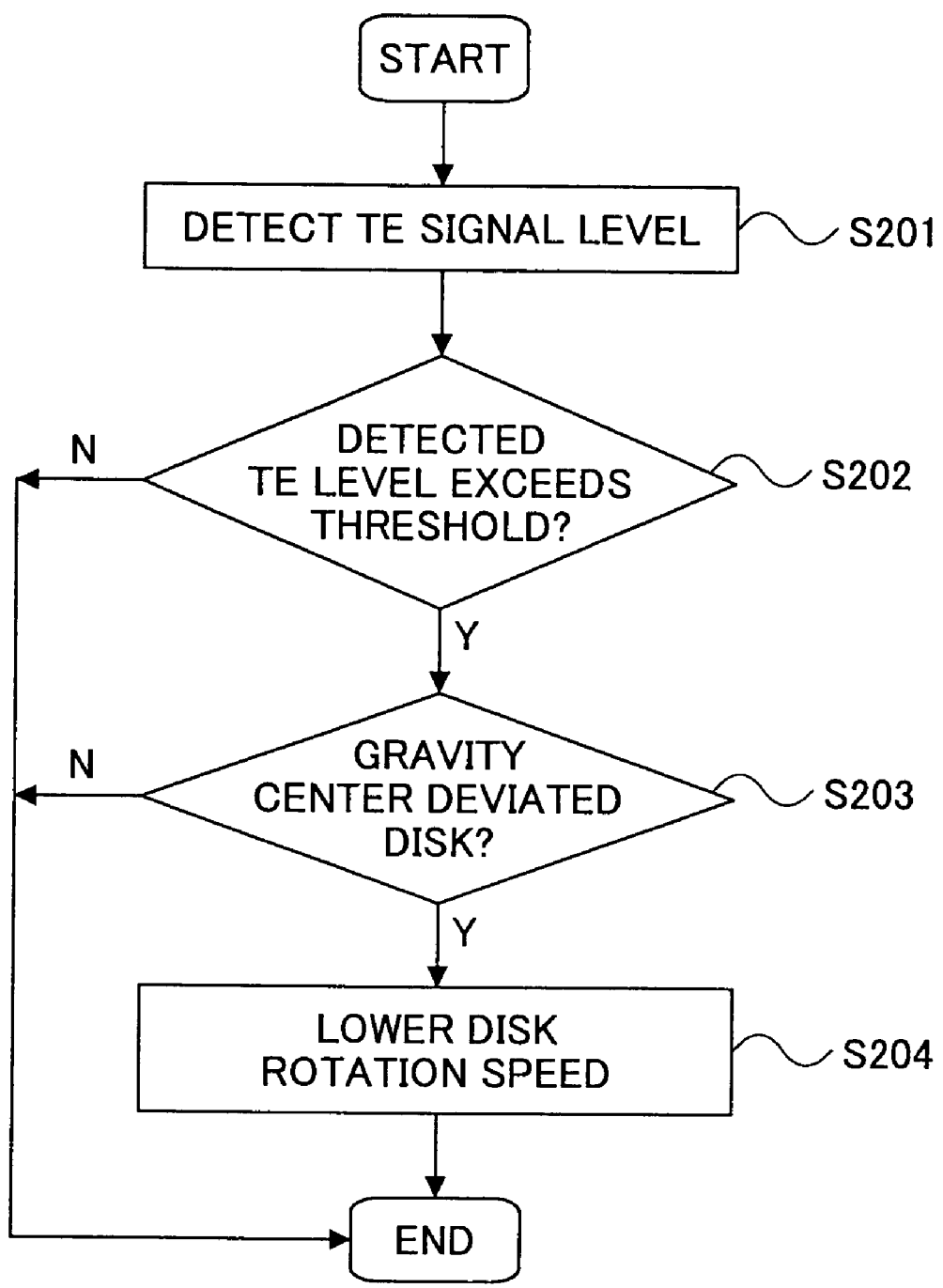
FIG. 9 is an operation flow chart which shows a process of controlling the disk rotation speed according to the embodiment of the present invention.

An operation flow chart of FIG. 9 shows the processing in which the MCU 62 controls the rotation speed of the disk 71, when the optical pickup 70 in the disk drive accesses the recording surface of the disk 71. In general, such a processing is performed at predetermined uniform intervals, for example, every 500 milliseconds, during the optical pickup accessing the disk surface.

First, the MCU 62 detects the TE signal level in Step S201. Next, the MCU 62 determines in Step S202 whether the thus-detected TE signal level exceeds the predetermined threshold. This determination is a determination as to whether or not a misalignment between the optical pickup 70 and the track 20 on the disk 71 is large. When the detected TE signal level does not exceed the threshold (No in Step S202), there should occur no problem even when the disk rotation speed is not especially lowered. Accordingly, the MCU 62 performs no special control in the disk rotation speed at least according to the determination result in Step S202, and finishes the processing of the flow chart of FIG. 9.

However, when the TE signal level exceeds the threshold (Yes in Step S202), the MCU 62 in Step S203 refers to the determination result as to whether or not the currently loaded disk is a gravity center deviated disk or an eccentric disk described above with reference to FIG. 7 made when the disk was loaded into the disk drive. Then, when the above-mentioned determination result indicates that the currently loaded disk is not a gravity center deviated disk (No in Step S203), there is a possibility that the currently loaded disk is an eccentric disk. However, even in a case of eccentric disk, a tracking servo control can properly function as mentioned above for achieving proper information recording/reproducing onto/from the disk 71 via the optical pickup 70. Accordingly, no special rotation speed control is performed at least according to the determination result in Step S203, and the processing of FIG. 9 is finished.

However, when the determination result in Step S203 indicates that the currently loaded disk is a gravity center deviated disk (Yes in Step S203), the MCU 62 makes a control such as to decrease the disk rotation speed in Step S204.

As mentioned above with reference to FIG. 6, a problematic situation may occur in which a vibration occurs in the disk drive in a serious level when the gravity center deviated disk is rotated without especially lowering the rotation speed from a standard disk rotation speed. Accordingly, it is necessary to lower the disk rotation speed when it is determined that the currently loaded disk 71 is a gravity center deviated disk as in the processing described above with reference to FIG. 9.

As to the above-mentioned threshold with which it is determined whether or not the currently loaded disk corresponds to a gravity center deviated disk in the step S104 in FIG. 7, the threshold may be determined in a factory before shipment of the relevant type of disk drive from a value obtained when a certain gravity center deviated disk for which a rotation speed should be lowered in the same type of disk drive is operated. In fact, the above-mentioned gravity center deviated disk for which a rotation speed should be lowered may vary according to a particular specification of the disk drive according to a particular customer's requirement. Therefore, it may be difficult to categorically determine the above-mentioned threshold. Actually, for example, a certain gravity center deviated disk which is a disk having a gravity center deviation which is the upper limit of a range within which the disk can be rotated at a standard rotation speed in the relevant type of disk drive is operated on a manufacture line of the factory for the inspection purpose or so, and the value of TE signal level change rate detected at this time by the same manner as that in which the TE signal level change rate is obtained in the disk drive in the step S104 of FIG. 7 may be used as the above-mentioned threshold.

As to the above-mentioned disk rotation speed to be lowered when it is determined that the currently loaded disk is a gravity center deviated disk in the step S204 in FIG. 9, the disk rotation speed is lowered into a predetermined rotation speed which may be determined before shipment of the relevant type of disk drive at the same time as that at which the above-mentioned threshold is determined in the factory.

Further, the present invention is not limited to the above-described embodiment, and variations and modifications may be made without departing from the basic concept of the present invention.

The present application is based on Japanese priority application No. 2002-255990 filed on Aug. 30, 2002, the entire contents of which are hereby incorporated by reference.

What is claimed is:

1. A disk drive comprising:
   a tracking error signal detecting part which detects a tracking error signal; and
   a gravity center deviated disk determination part which determines whether or not a currently loaded disk is a gravity center deviated disk, based on the tracking error signal detected at different disk rotation speeds detected by said tracking error signal detecting part.

2. The disk drive as claimed in claim 1, further comprising a rotation speed control part which controls a rotation speed of the disk based on the determination result given by said gravity center deviated disk determination part.

3. The disk drive as claimed in claim 2, wherein:
   said rotation speed control part makes a control of rotation speed of the disk such as to lower the rotation speed of the disk when the determination result of said gravity center deviated disk determination part indicates that the disk is a gravity center deviated disk.

4. The disk drive as claimed in claim 1, wherein:
   said gravity center deviated disk determination part makes a determination that the disk is a gravity center deviated disk when a change rate of detection level of the tracking error signal with respect to the disk rotation speed exceeds a predetermined threshold.

5. The disk drive as claimed in claim 1, wherein:
   the tracking error signal indicates a misalignment of a head which performs information reading/writing on the disk from a track provided on the disk, and has a larger level as the misalignment becomes larger.

6. A disk drive controlling method comprising the steps of:
   a) detecting a tracking error signal; and
   b) determines whether or not a currently loaded disk is a gravity center deviated disk based on the tracking error signal detected at different disk rotation speeds detected in said step a).

7. The disk drive controlling method as claimed in claim 6, further comprising the step of:
   c) controlling a rotation speed of the disk based on the determination result obtained in said step b).

8. The disk drive controlling method as claimed in claim 7, wherein:
   said step c) comprises a control of rotation speed of the disk such as to lower the rotation speed of the disk when the determination result of said step b) indicates that the disk is a gravity center deviated disk.

9. The disk drive controlling method as claimed in claim 6, wherein:
   said step b) comprises a step of making a determination that the disk is a gravity center deviated disk when a change rate of detection level of the tracking error signal with respect to the disk rotation speed exceeds a predetermined threshold.

10. The disk drive controlling method as claimed in claim 6, wherein:
    the tracking error signal obtained in said step a) indicates a misalignment of a head which performs information reading/writing on the disk from a track provided on the disk, and has a larger level as the misalignment becomes larger.

11. A disk drive controlling program making a computer execute the steps of:
    a) detecting a tracking error signal; and
    b) determining whether or not a currently loaded disk is a gravity center deviated disk based on the tracking error signal detected at different disk rotation speeds obtained in said step a).

12. The disk drive controlling program as claimed in claim 11, further making the computer execute the step of:
    c) controlling a rotation speed of the disk based on the determination result obtained in said step b).

13. The disk drive controlling program as claimed in claim 12, wherein:
    said step c) comprises a control of rotation speed of the disk such as to lower the rotation speed of the disk when the determination result of said step b) indicates that the disk is a gravity center deviated disk.

14. The disk drive controlling program as claimed in claim 11, wherein:
    said step b) comprises a step of making a determination that the disk is a gravity center deviated disk when a change rate of detection level of the tracking error signal with respect to the disk rotation speed exceeds a predetermined threshold.

15. The disk drive controlling program as claimed in claim 11, wherein:
    the tracking error signal obtained in said step a) indicates a misalignment of a head which performs information reading/writing on the disk from a track provided on the disk, and has a larger level as the misalignment becomes larger.

* * * * *